US006172456B1

(12) United States Patent
Cathey et al.

(10) Patent No.: US 6,172,456 B1
(45) **Date of Patent: *Jan. 9, 2001**

(54) FIELD EMISSION DISPLAY

(75) Inventors: David A. Cathey, Boise; Charles Watkins, Meridian, both of ID (US)

(73) Assignee: Micron Technology, Inc., Boise, ID (US)

( * ) Notice: Under 35 U.S.C. 154(b), the term of this patent shall be extended for 0 days.

This patent is subject to a terminal disclaimer.

(21) Appl. No.: 09/286,267

(22) Filed: Apr. 5, 1999

Related U.S. Application Data

(63) Continuation of application No. 08/931,811, filed on Sep. 16, 1997, now Pat. No. 5,910,705, which is a continuation of application No. 08/386,645, filed on Feb. 10, 1995, now abandoned.

(51) Int. Cl.[7] .......... A01J 63/00

(52) U.S. Cl. .......... 313/495; 313/496; 313/497; 313/336

(58) Field of Search .......... 313/495, 496, 313/497, 422, 309, 336, 351, 17, 25, 477 R, 481, 482

(56) References Cited

U.S. PATENT DOCUMENTS

| | | | |
|---|---|---|---|
| 3,665,238 | 5/1972 | Van Esdonk et al. | 313/220 |
| 4,387,283 | 6/1983 | Peterson et al. | 219/56.21 |
| 4,769,345 | 9/1988 | Butt et al. | 437/217 |
| 4,857,161 | 8/1989 | Borel et al. | 204/192.26 |
| 4,857,799 | 8/1989 | Spindt et al. | 313/495 |
| 4,923,421 | 5/1990 | Brodie et al. | 445/24 |
| 5,015,912 | 5/1991 | Spindt et al. | 313/495 |
| 5,063,327 | 11/1991 | Brodie et al. | 313/482 |
| 5,075,591 | 12/1991 | Holmberg | 313/495 |
| 5,140,219 | 8/1992 | Kane | 313/495 |

(List continued on next page.)

OTHER PUBLICATIONS

Montgomery, Clive Richard, "Flip Chip Assemblies Using Conventional Wire Bonding Apparatus and Commerically Available Dies," ISHM '93 Proceedings, pp. 451–456.

IBM Technical Disclosure, "Direct Chip Bonding For Liquid Crystal Display", vol. 34, No. 5, Oct. 1991, pp. 183–184.

"Liquid Crystal Display Products", Product Brochure, Standish LCD, Division of Standish Industries, Inc., pp. 5–6.

"Process–Stabilized Extrude Bonding Wire and Ribbon", Product Brochure, Hydrostatics Inc., Bethlehem PA, (Jun. 1991).

Kondoh, You et al. "A Subminiature CCD Module Using a New Assembly Technique", IEICE Transactions, vol.E 74, No. 8 Aug. 1991.

Cohen, I.M. et al. "Ball Formation Processes in Alumium Bonding Wire", Solid State Technology, pp. 89–92, Dec. 1985.

Levy, F. et al. "Phosphors for Full Color Microtips Fluorescent Displays", pp. 20–23, IEEE, 1991.

Kang, Sa–Yoon et al. Physical and Fuzzy Logic Modeling of a Flip–Chip Thermocompression Bonding Process, Journal of Electronic Packaging, pp. 63–70, Mar. 1993.

Charles, Jr., H.K. "Electronic Materials Handbook—Vol. 1 Packaging", Product Brochure, ASM International.

*Primary Examiner*—Nimeshkumar D. Patel
*Assistant Examiner*—Matthew J. Gerike
(74) *Attorney, Agent, or Firm*—Wells, St. John, Roberts, Gregory & Matkin P.S.

(57) ABSTRACT

A flat-panel field emission display comprises a luminescent faceplate, a rigid backplate, and an interposed or sandwiched emitter or cathode plate. A positioning spacer or connector ridge is formed on the rear surface of the faceplate to space the cathode plate a fixed distance behind the faceplate. A peripheral seal is formed between the faceplate and the backplate. The faceplate, backplate, and peripheral seal define an evacuated internal space which contains the cathode plate. The backplate is spaced behind the cathode plate to create a rearward vacuum space in which a getter is located.

26 Claims, 10 Drawing Sheets

U.S. PATENT DOCUMENTS

| | | | | |
|---|---|---|---|---|
| 5,151,061 | | 9/1992 | Sandhu | 445/24 |
| 5,157,304 | | 10/1992 | Kane et al. | 313/495 |
| 5,207,607 | | 5/1993 | Nagano et al. | 445/25 |
| 5,223,766 | | 6/1993 | Nakayama et al. | 313/495 |
| 5,249,732 | | 10/1993 | Thomas | 228/179.1 |
| 5,272,413 | * | 12/1993 | Yamazaki et al. | 313/495 |
| 5,361,079 | | 11/1994 | Yamamato | 313/496 |
| 5,381,039 | | 1/1995 | Morrison | 257/701 |
| 5,424,605 | | 6/1995 | Lovoi | 313/495 |
| 5,520,563 | | 5/1996 | Wallace et al. | 445/24 |
| 5,525,861 | * | 6/1996 | Banno et al. | 313/495 |
| 5,537,738 | * | 7/1996 | Cathey et al. | 29/830 |
| 5,577,944 | * | 11/1996 | Taylor | 445/25 |
| 5,587,622 | | 12/1996 | Mohacsi | 313/493 |
| 5,589,731 | | 12/1996 | Fahlen et al. | 313/495 |
| 5,612,256 | * | 3/1997 | Stansbury | 437/209 |
| 5,614,785 | | 3/1997 | Wallace et al. | 315/496 |
| 5,653,017 | * | 8/1997 | Cathey et al. | 29/830 |
| 5,760,470 | * | 6/1998 | Stansbury | 257/690 |
| 5,766,053 | * | 6/1998 | Cathey et al. | 445/25 |
| 5,786,232 | * | 7/1998 | Stansbury | 438/20 |
| 5,910,705 | * | 6/1999 | Cathey et al. | 313/496 |

* cited by examiner

FIELD EMISSION DISPLAY

RELATED PATENT DATA

This patent resulted from a continuation application of U.S. patent application Ser. No. 08/931,811, filed Sep. 16, 1997, naming David A. Cathey and Charles Watkins as inventors, and which is now U.S. Pat. No. 5,910,705. That patent resulted from a continuation application of U.S. patent application Ser. No. 08/386,645, filed Feb. 10, 1995, listing the inventors as David A. Cathey and Charles Watkins, now abandoned.

TECHNICAL FIELD

This invention relates flat-panel field emissions displays.

BACKGROUND OF THE INVENTION

Flat-panel displays are widely used to visually display information where the physical thickness and bulk of a conventional cathode ray tube is unacceptable or impractical. Portable electronic devices and systems have benefitted from the use of flat-panel displays, which require less space and result in a lighter, more compact display system than provided by conventional cathode ray tube technology.

The invention described below is concerned primarily with field emission flat-panel displays. In a field emission flat-panel display, an electron emitting cathode plate is separated from a display face or faceplate at a relatively small, uniform distance. The intervening space between these elements is evacuated. Field emission displays have the outward appearance of a CRT except that they are very thin. While being simple, they are also capable of very high resolutions. In some cases they can be assembled by use of technology already used in integrated circuit production.

Field emission flat-panel displays utilize field emission devices, in groups or individually, to emit electrons that energize a cathodoluminescent material deposited on a surface of a viewing screen or display faceplate. The emitted electrons originate from an emitter or cathode electrode at a region of geometric discontinuity having a sharp edge or tip. Electron emission is induced by application of potentials of appropriate polarization and magnitude to the various electrodes of the field emission device display, which are typically arranged in a two-dimensional matrix array.

Field emission display devices differ operationally from cathode ray tube displays in that information is not impressed onto the viewing screen by means of a scanned electron beam, but rather by selectively controlling the electron emission from individual emitters or select groups of emitters in an array. This is commonly known as "pixel addressing."

It is important in field emission displays that the particle emitting surface of the electrode emitting cathode plate and the opposed display face be insulated from one another by a small distance across the full area of the display face. This is required to prevent electrical breakdown between the emitting surface and the display face. Furthermore, the spacing must be precisely uniform to assure uniform resolution, focus, and brightness.

In addition to uniform spacing of the display elements, it is also important to maintain the quality of the high vacuum typically required within such displays. According to the present invention, this is accomplished by providing of a getter in open communication with the evacuated space separating the particle emitting surface and the opposed display face. A getter is a chemically active substance such as metallic barium which removes traces of gas from otherwise evacuated spaces.

Many prior art field emission flat-panel displays use glass cathode plates. The invention described below, however, preferably utilizes a silicon or semiconductor substrate for its cathode or emitter plate. This allows conventional semiconductor processing techniques to be used in forming individual cathodes and addressing circuitry.

U.S. Pat. No. 4,923,421 to Brodie et al. describes one prior art display device utilizing a silicon cathode plate in a flat-panel display. Such has a transparent faceplate and a semiconductor backplate upon which cathodes are formed. The space between the faceplate and the backplate is evacuated. One problem with a device such as this is the maintenance of the required parallel spacing between the cathode plate and the faceplate. This problem is the result of the high vacuum inside the structure. This tends to bow the relatively thin semiconductor backing plate inward. To prevent such bowing, Brodie proposes a plurality of spacers interspersed between cathodes. While effective, such spacers are difficult to fabricate and interfere with cathode formation and placement.

Another problem with using a silicon backplate or cathode plate in conjunction with a glass faceplate is the difficulty of forming an adequate seal between the silicon and the glass for purposes of maintaining a vacuum within the display structure. Even when this problem is solved, valuable silicon real estate must be used for completing the seal. This reduces the number of cathode plates which can be fabricated from a single semiconductor wafer, and therefore adds to the cost of the display subsystem.

Further, present flat-panel display technology does not adequately address the problem of establishing electrical connections to the internal electrode circuits of a flat-panel displays. While the Brodie patent mentions "through-the-wafer" connections, these connections are difficult to manufacture and are detrimental to maintaining the desired vacuum within the flat-panel display.

The invention described below addresses each of the problems noted above, while achieving a simplicity which has been absent from prior designs.

BRIEF DESCRIPTION OF THE DRAWINGS

FIG. 13 is a cross-sectional view showing the backplate of FIG. 12 assembled with the subassembly of FIG. 11 in accordance with the invention.

DETAILED DESCRIPTION OF THE PREFERRED EMBODIMENTS

Figure 1:
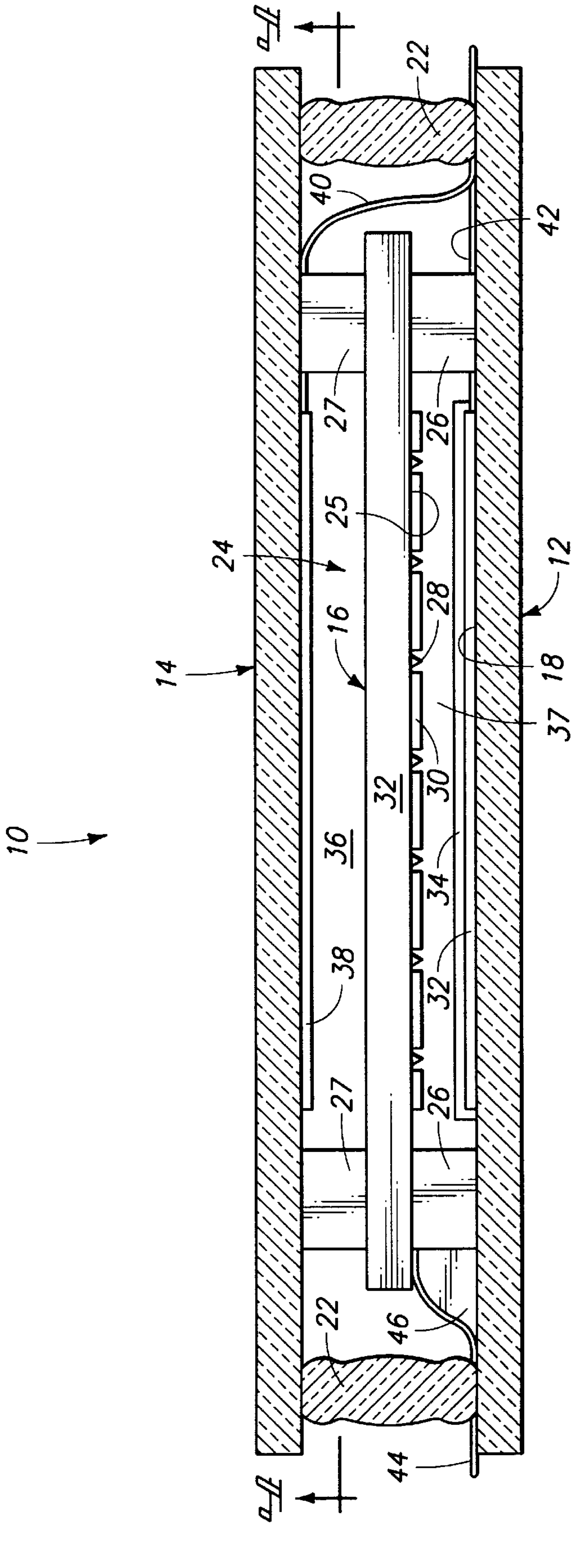
FIG. 1 is a diagrammatic sectional view of a field emission flat-panel display in accordance with a preferred embodiment of the invention.
Figure 2:
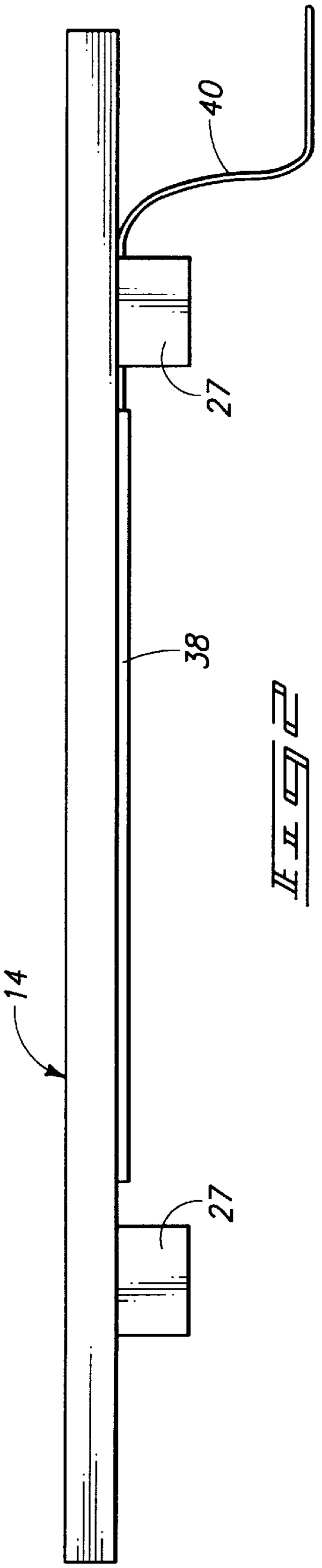
FIG. 2 is an end view which shows a subassembly of the flat-panel display of FIG. 1. The subassembly includes a backplate and rear positioning spacers.

This disclosure of the invention is submitted in furtherance of the constitutional purposes of the U.S. Patent Laws "to promote the progress of science and useful arts." U.S. Constitution, Article 1, Section 8.

FIGS. 1–4 show components of a flat-panel field emission display 10 in accordance with a preferred embodiment of the invention. It is to be understood that the drawings are not to scale. They have been simplified to illustrate the novel features of the invention and its constituent parts. Some features of the preferred embodiment are also described in two concurrently-filed applications, both assigned to Micron Display Technology, Inc., entitled "Multilayer Electrical Interconnection Structures and Fabrication Methods" and "Methods of Mechanical and Electrical Substrate Connection," the disclosures of which are hereby incorporated by reference.

Flat-panel display 10 generally includes a transparent faceplate 12, a backplate 14, and a cathode plate 16 positioned between faceplate 12 and backplate 14. Faceplate 12 is made from glass in a rigid and planar form. It has a rear surface 18 which is luminescent in response to impinging electrons. Backplate 14 is likewise made from glass in a rigid and planar form.

Backplate 14 is spaced rearwardly behind transparent faceplate 12 by a peripheral spacer 22 (FIG. 1). Peripheral spacer 22 extends between faceplate 12 and backplate 14 in a continuous path around the entire periphery of backplate 14 and faceplate 12. Peripheral spacer 22 also functions as a seal. Faceplate 12, backplate 14, and peripheral spacer 22 define an evacuated space 24 which contains cathode plate 16.

Cathode plate 16 is mounted to transparent faceplate 12 at a spaced distance from faceplate rear surface 18. More specifically, cathode plate 16 has a front emitter surface 25 positioned rearwardly adjacent and facing rear surface 18 of faceplate 12. The desired spacing between faceplate rear surface 18 and cathode plate front emitter surface 25 is established and maintained by one or more front positioning spacers 26 which are formed on rear surface 18 of faceplate 12. Front positioning spacers 26 are interposed between faceplate 12 and cathode plate 16 to space front emitter surface 25 rearwardly from faceplate rear surface 18. Cathode plate 16 is positioned behind and against front positioning spacers 26.

Cathode plate 16 comprises a silicon substrate. An emitter matrix is formed on front surface 25 of cathode plate 16, facing faceplate rear surface 18. The emitter matrix comprises a plurality of field emission devices formed on the front emitter surface 25 of the silicon substrate. Each field emission device is a small emitter tip, electrode, or cathode 28 surrounded by a gate structure. The gate structures of cathode plate 16 are symbolically represented in FIGS. 1 and 3, designated by the reference numeral 30. Gate structures 30 control the electron emission of electrodes 28 in response to externally-supplied control signals. The emitter tips 28 and gate structures 30 are produced on the cathode plate 16 by well-known thin film processes. Cathode plate 16 is alternatively referred to as an electrode plate or an emitter plate.

The field emitter devices included within the emitter matrix of cathode plate 16 are directed toward faceplate rear surface 18. Rear surface 18 includes a cathodoluminescent area which preferably is coated with a luminescent material, such as a phosphor coating or screen 32, and an overlying aluminum coating 34. The phosphor screen produced on the faceplate rear surface 18 is preferably aluminized. Alternatively, a transparent conductive film is applied to rear surface 18 prior to providing the phosphor coating.

The cathodoluminescent area of faceplate rear surface 18 is arranged coincidental with the operational area of the field emitter devices included in the emitter matrix of cathode plate 16. Emitter tips 28 emit electrons which are drawn toward rear surface 18 by a high differential voltage between emitter tips 28 and phosphor screen 32 in accordance with known operational characteristics of field emission displays.

Backplate 14 is spaced behind cathode plate 16 by peripheral spacer 22. In addition, one or more rear positioning spacers 27 are interposed between backplate 14 and cathode plate 16. Rear positioning spacers 27, in conjunction with front positioning spacers 26, mount cathode plate 16 at the correct position between backplate 14 and transparent faceplate 12. The spaces between backplate 14 and cathode plate 16 and between faceplate 12 and cathode plate 16 are evacuated, creating a rearward vacuum space 36 behind cathode plate 16 and a forward vacuum space 37 in front of cathode plate 16.

The particular construction described above provides several significant advantages over the prior art. First, the sandwiched and spaced configuration of the faceplate, cathode plate, and backplate eliminates any need for a gas-tight silicon-to-glass seal. Previous efforts to use silicon cathode plates utilized the cathode plates as backplates, thus requiring a silicon-to-glass seal in order to establish a vacuum between the field emission devices and the luminescent faceplate. Acceptable silicon-to-glass seals are difficult to form. However, placing a cathode plate completely within an enclosed vacuum space eliminates any need for a silicon-to-glass seal in the embodiment described above. This also eliminates the use of valuable silicon real estate for seal formation, thereby increasing the yield of cathode plates from single semiconductor wafers.

In addition, prior art configurations which utilized cathode plates as backplates also imposed stringent structural requirements on the cathode plates, whether such plates were formed of silicon or other materials. Such structural requirements were imposed because of the need for the cathode plate to maintain a parallel and precisely-spaced relationship with the faceplate despite a high differential pressure on the opposed sides of the cathode plate. For instance, whereas the exposed rearward side of such a cathode plate would be at atmospheric pressure, a high vacuum of less than $10^{-6}$ Torr would generally be applied between the luminescent faceplate and the forward or internal side of the cathode plate. Prior art devices frequently used spacers or supports, distributed between emitter tips, to maintain proper spacing between the cathode plate and the faceplate. The preferred embodiment of the invention, in contrast, eliminates any pressure differential between the sides of the cathode plate. This reduces structural requirements, eliminating the need for distributed spacers. Rather, the cathode plate in the invention described above is positioned only by spacers about its outer periphery, outside of the area upon which the emitter tips are formed.

A further advantage of the preferred embodiment flat-panel display is that it avoids the creation of closely adjacent flat surfaces within evacuated space 24. Closely adjacent flat surfaces are detrimental to establishing a vacuum within an enclosed space, often resulting in what is known as a "virtual vacuum leak." For instance, affixing a silicon cathode plate to the surface of a glass backplate would be likely to result in such a virtual leak. However, spacing backplate 14 from cathode plate 16 avoids this problem.

Furthermore, the creation of rearward vacuum space 36 behind the cathode plate facilitates use of a getter. Specifically, flat-panel display 10 has a getter 38 positioned in rearward vacuum space 36, preferably on the forward surface of backplate 14. Getter 38 can be in the form of wires or plates of conventional getter material for chemically combining with gaseous materials produced during operation of the display. The material used to form getter 38 can be applied using any appropriate technique, including electrophoresis, screen printing, electrostatic deposition or fabrication of getter wire.

Getter 38 is illustrated as being mounted to the forward surface of backplate 14 behind cathode plate 16. If desired, it could alternatively be located on the back surface of cathode plate 16 or at other positions in the rearward vacuum space. Conductive leads 40, leading to getter 38, are sealed to the rearward surface of faceplate 12 and extend beneath peripheral seal 22, as shown in FIG. 1.

The foregoing discussion describes various aspects of the invention in general terms. The discussion below will provide more detail regarding the invention, as well as preferred operational steps in fabricating a flat-panel display in accordance with the invention. Certain new fabrication techniques will be described in conjunction with the discussion. Some of these techniques are useful in environments other than those relating to display technology. Nevertheless, the apparatus and processes described below are particularly advantageous in relation to flat-panel displays, and even more particularly in relation to flat-panel displays utilizing field emission technology.

In general, the steps involved in producing the packaged display include initially forming a subassembly comprising faceplate 12 and cathode plate 16. Initially, faceplate 12 is prepared by forming front positioning spacers 26 on rear surface 18. Spacers 26 are preferably stenciled or screen-printed on rear surface 18 using conventional thickfilm, multi-layer technology and a dielectric material such as a glass frit. The term "thick-film" is used to designate screen printing and firing processes which result in layers having thicknesses in the range of greater than five microns.

The glass frit used is preferably a devitrifying frit, which adheres to a glass substrate at its softening temperature but remelts at a higher temperature. It can be applied within the openings of a stencil (not shown) in the form of a paste produced by combining the glass frit with a solvent (such as pine oil). After applying the paste containing glass frit to faceplate rear surface 18, faceplate 12 is heated to a firing temperature to produce solid glass spacers of the desired shape and thickness, as determined by the stencil or other selected application method. The thickness of spacers 26 is selected to provide the appropriate spacing between faceplate 12 and cathode plate 16, and to maintain cathode plate 16 in a parallel relationship with faceplate 12.

Figure 3:
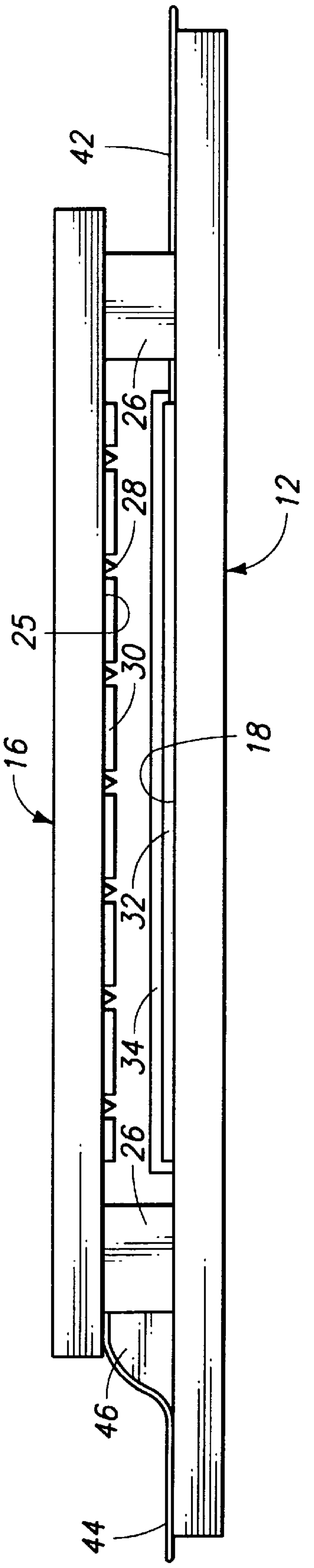
FIG. 3 is an end view which shows a subassembly of the flat-panel display of FIG. 1. This subassembly includes a faceplate and an attached silicon cathode plate.
Figure 4:
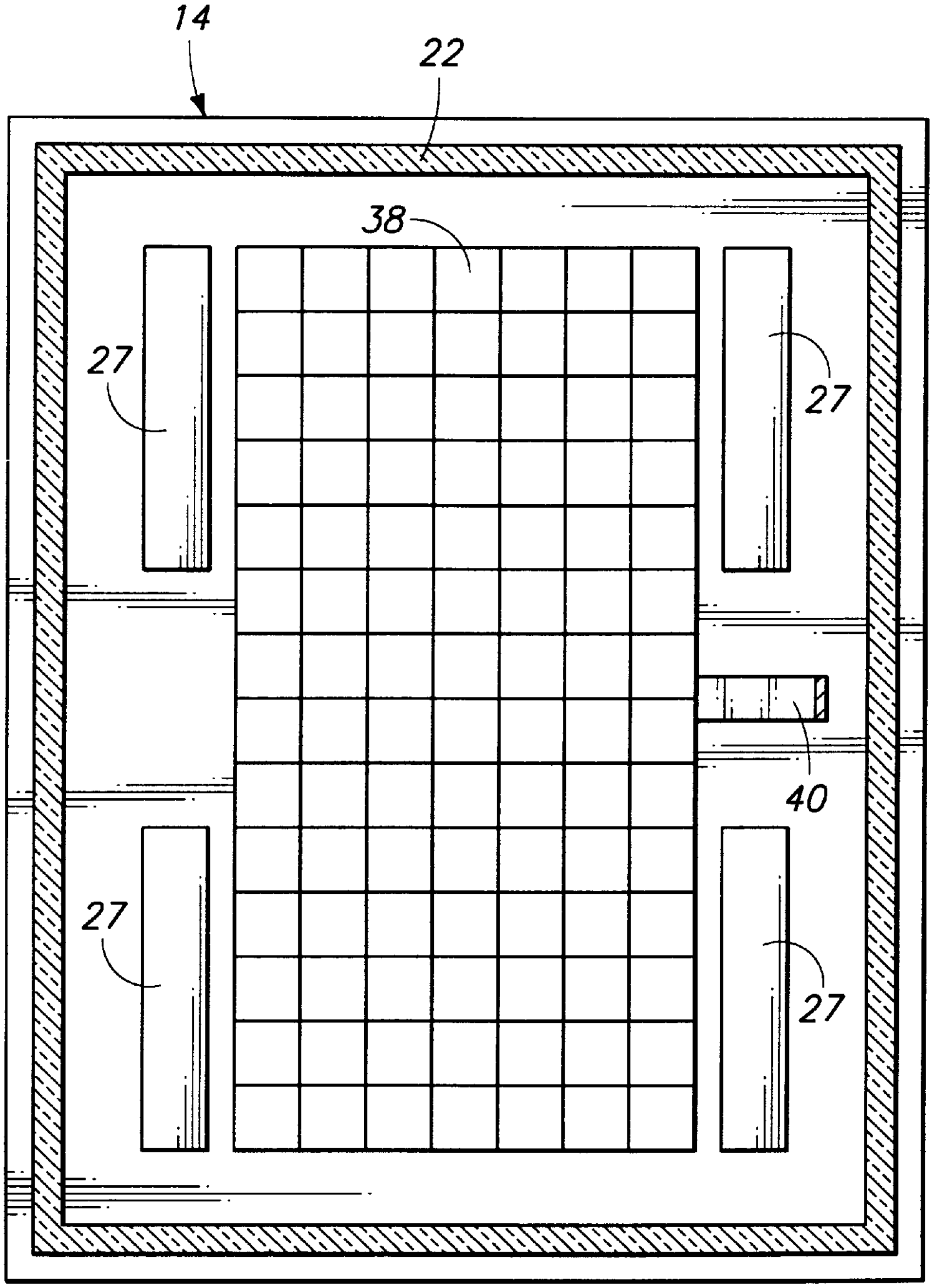
FIG. 4 is a reduced scale bottom view of the backplate shown in FIG. 2.

Conductive leads 42, leading eventually to phosphor screen 32, are bonded to faceplate rear surface 18. In addition, a plurality of conductive traces or terminal connectors 44 are applied over rear surface 18 and one of front spacers 26 for contact with corresponding conductors of cathode plate 16. Further details and preferred alternatives regarding the connection between conductive leads 44 and the cathode plate will be set forth below. However, conductive leads 44 can be formed as shown in FIGS. 1 and 3 over a ramped spacer 46 after firing of the spacers 26 and 46, and prior to bonding cathode plate 16 to front spacers 26. Conductive leads 42 and 44 can be produced by one of many suitable techniques, including screen printing, thick film application, patterned evaporation, etc.

After applying phosphor coating 32 to rear surface 18, cathode plate 16 is bonded or attached to front spacers 26 by a suitable adhesive. The portions of conductive leads 44 which extend over front spacers 26 engage complementary pads on the active surface of cathode plate 16 to form effective electrical conductive paths to the emitter circuits. In the embodiment of FIGS. 1–4, cathode plate 16 is bonded to faceplate 12 by compressing the two components toward each other while heating them to the bonding temperature of the glass frit used to form spacers 26.

Backplate 14 is then prepared by forming rear positioning spacers 27 on its front surface in a manner similar or identical to the formation of front positioning spacers 26. Spacers 26 and 27 are illustrated as identical structures in spatial registry with one another, but such identity is not essential to the present disclosure. Spacers 26 and 27 can have different sizes and relative locations about the respective backplate 14 and faceplate 12, depending upon the structural requirements and physical arrangement of a specific display. Getter 38 and conductive lead 40 are provided as described above after forming spacers 27. Alternatively, a non-evaporable getter could be used, in which no conductive lead would be required. Activation of this type of getter would occur during the high temperatures used during seal formation.

After forming rear spacers 27 and providing getter 38, peripheral spacer 22 is formed by extruding or otherwise applying a stiff glass frit paste to the front surface of backplate 14 about the intended path of peripheral spacer 22. The glass frit used for production of the peripheral seal 22 can either be a vitreous frit or a devitrifying frit. The critical physical property required in this frit is that it must vitrify at a firing temperature that is lower than the softening temperature of the frit used to form spacers 26 and 27. The frits chosen for use in producing the spacers must also have coefficients of expansion substantially matching that of the glass within backplate 14 and faceplate 12.

Backplate 14 is next moved into a position behind cathode plate 16. Bonding pressure is then applied to urge backplate 14 and faceplate 12 toward one another and intervening cathode plate 16 while heating the assembly to the firing temperature of the glass frit used to form peripheral spacer 22. This step normally takes place within a vacuum chamber maintained at the intended interior vacuum pressure for the display, but vacuum pressure could be subsequently achieved within the display by access through a sealable tube or other opening leading through the fired seal structure.

Depending upon the nature of the getter 38, it might be activated by the application of heat required to fire the peripheral spacer 22. It also might be activated by heat generated by application of electrical current through conductive leads 40 after assembly has been completed, or by RF energy.

Firing of the glass frit within the peripheral spacer 22 does not affect the previously-formed bonds at the respective ends of front spacers 26, since spacers 26 will not be heated to their softening temperature. Thus, the critical spacing between faceplate 12 and cathode plate 16 can be maintained during the formation of the glass peripheral spacer 22.

No bond is required between rear spacers 27 and the backside of cathode plate 16, since the purpose of spacers 27 is simply to locate backplate 14 and cathode plate 16 in spaced parallel positions at a distance that is not critical to display operation.

Figure 5:
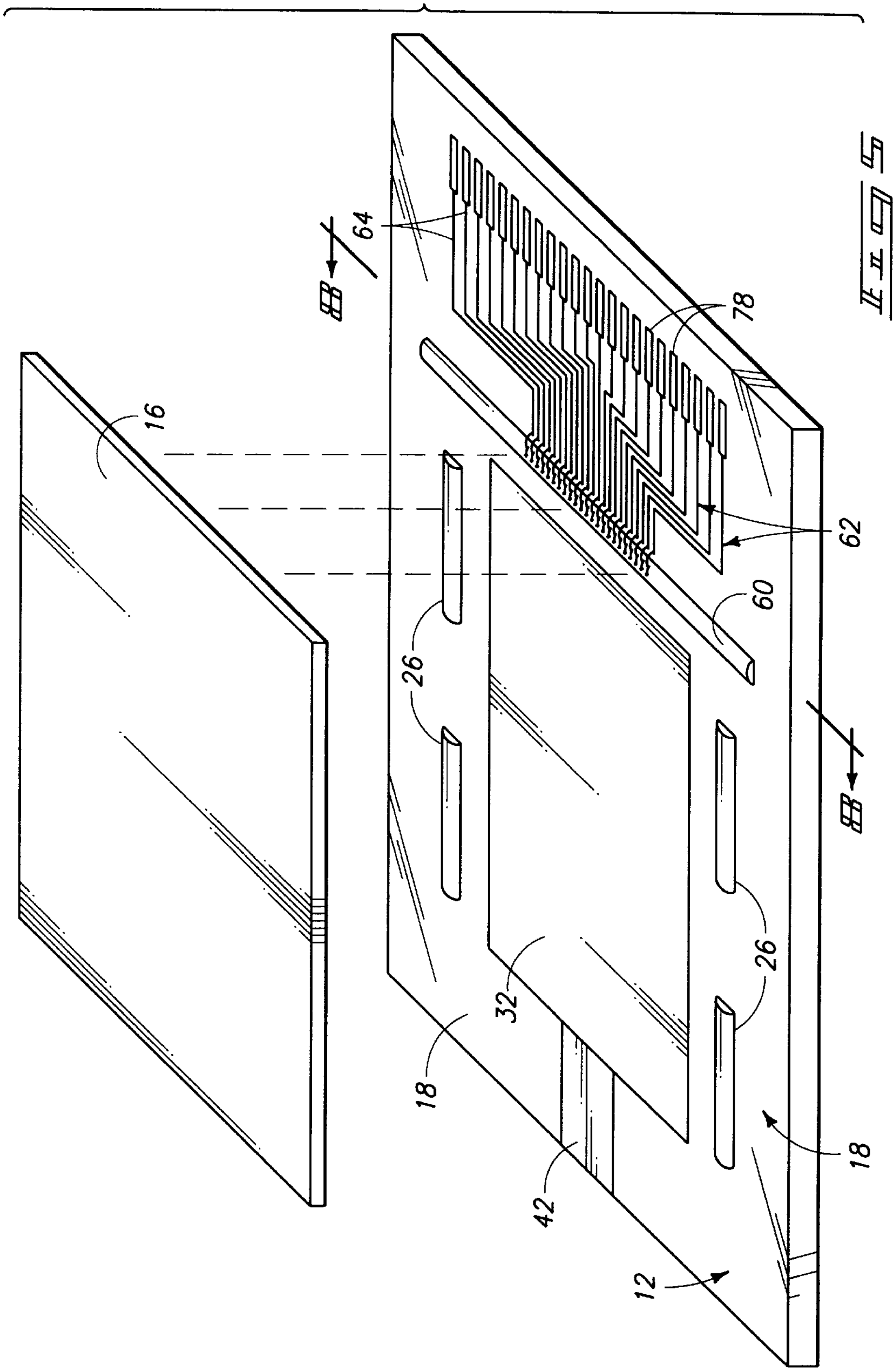
FIG. 5 is a simplified exploded perspective view of a subassembly in accordance with the invention which includes a faceplate and a silicon cathode plate.

FIGS. 5–8 show more specific details regarding preferable techniques for forming mechanical and electrical connections between the cathode plate and the faceplate, and for spacing the cathode plate from the faceplate. FIG. 5 shows cathode plate 16 positioned over transparent faceplate 12 prior to bonding the two elements. Faceplate 12 includes phosphor screen 32, a conductive lead 42, and a plurality of front positioning spacers 26 as discussed above. In addition, faceplate 16 includes an elevated connector ridge 60 and a plurality of faceplate terminal conductors 62 overlying faceplate rear surface 18.

Connector ridge 60 is an elongated platform formed along faceplate rear surface 18 by conventional thick film stenciling or screen printing techniques with a dielectric material such as a devitrifying frit. It is preferably formed simultaneously with forming front positioning spacers 26. However, positioning spacers 26 preferably have greater thicknesses than connector ridge 60. Specifically, connector ridge 60 is formed with a thickness of about one mil less than that of positioning spacers 26. Typically, the positioning spacers will have a thickness of about eight mils and the connector ridge will have a thickness of about seven mils.

Figure 6:
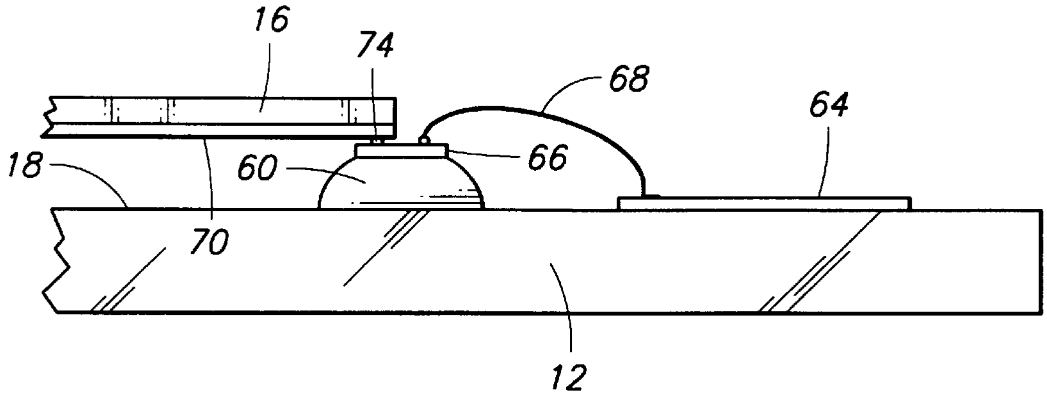
FIG. 6 is a partial cross-sectional view of the subassembly shown in FIG. 5, showing a faceplate connector ridge and associated connection circuitry. The faceplate and cathode plate are shown in their assembled positions.

Faceplate terminal conductors 62 are conductive metal traces having portions which extend over connector ridge 60. Terminal conductors 62 thus have base portions 64 and connecting portions 66 (FIG. 6). Base portions 64 are positioned directly over faceplate rear surface 18 while connecting portions 66 are positioned atop and overlie connector ridge 60. Terminal conductors 62 are formed by screenprinting, using conventional thick-film multi-layer technology. There is a gap between base portions 64 and connecting portions 66, necessitated by the difficulty of screen-printing over the abrupt elevational change presented by connecting ridge 60. However, the base and connecting portions of individual conductive traces are electrically connected to each other by a plurality of bond wire interconnections 68. Each bond wire interconnection 68 is a length of bond wire which extends between a base portion 64 and its corresponding connecting portion 66. Each bond wire interconnection 68 is connected and anchored at each of its respective ends by a ball bond or wedge bond. Conventional wire bonding equipment is used to create the bond wire interconnections.

This type of connection is a distinct improvement over prior art technology, such as "via" technology, for connecting between different levels of a multi-layer circuit. It is especially advantageous in the environment described above, in which a substrate is to be mounted, face down, over elevated conductors which must, in turn, be connected to conductors at a lower level.

Cathode plate 16 has a plurality of emitter or electrode conductors 70 on or adjacent its front emitter surface 25. These conductors are electrically connected to individual emitters or electrodes of cathode plate 16. In most cases, the electrical connection between the conductors and the emitters will be through multiplexing circuitry (not shown) on cathode plate 16.

Each emitter conductor 70 terminates in a bond pad 72 on or adjacent an outer edge of front emitter surface 25. Cathode plate 16 is positioned over connector ridge 60 for electrical contact between cathode plate 16 and connecting portions 66 of terminal conductors 62. Bond pads 72 are aligned with connecting portions 66.

A plurality of conductive metal bonds are formed by deformable metal bumps 74 which are interposed between faceplate rear surface 18 and cathode plate 16. The metal bumps form individual electrical connections between faceplate 12 and cathode plate 16. Metal bumps 74 are formed in accordance with conventional bumping techniques between terminal conductor connecting portions 66 and cathode plate bond pads 72. Cathode plate 16 is pressed against faceplate 12 to smash metal bumps 74 and to thereby form the conductive bonds. Metal bumps 74 also form physical bonds when used in this manner. This process, used in other applications within the semiconductor industry, is referred to as flip-chip technology. The conductive and physical bonds described above are therefore alternatively referred to as conductive flip-chip bonds. Heat is sometimes used in conjunction with pressure to form the bonds.

Flip-chip technology also includes precision alignment equipment which is advantageously used to align bond pads 72 with terminal conductors 62 and to align emitter tips on cathode plate 16 with appropriate phosphor pixels on faceplate 12 before cathode plate 16 is pressed against faceplate 12. Two or more alignment dots are printed on each of cathode plate 16 and faceplate 12 to facilitate this process in accordance with conventional flip-chip techniques.

The invention thus includes a number of unique methodical steps which result in the structure described above. Such steps include mounting cathode plate 16 to luminescent faceplate 12 at a spaced distance from faceplate rear surface 18 and subsequently affixing backplate 14 to faceplate 12 behind cathode plate 16. Further steps include spacing backplate 14 rearward from faceplate 12 to create an internal space between backplate 14 and faceplate 12. The internal space contains the cathode plate and creates a rearward vacuum space behind cathode plate 16. The invention also includes providing a getter in the rearward vacuum space and, finally, evacuating the internal space between the backplate and luminescent faceplate.

Mounting cathode plate 16 to faceplate 12 is accomplished through the flip-chip or metal bumping technology described above. Preferable steps include forming front positioning spacers 26 on faceplate rear surface 18 and simultaneously forming one or more connector ridges 60 on faceplate rear surface 18. Further steps include screen printing a plurality of conductive traces, referred to herein as faceplate terminal conductors 62, overlying faceplate rear surface 18 and extending over connector ridge 60. The terminal conductors have base portions 64 and connecting portions 66 which are electrically connected by wire bonding the base portions of individual conductive traces to their corresponding connecting portions.

Conductive bonds between terminal conductors 62 and emitter conductors 70 are formed by providing metal bumps 74 between connecting portions 66 and cathode plate bond pads 72 prior to pressing cathode plate 16 against faceplate 12. Metal bumps 74 can be formed on either connecting portions 66 or bond pads 72. The metal bumps form the conductive bonds between the cathode plate bond pads and the terminal conductors as a result of pressing the cathode plate against the faceplate.

The conductive metal bonds form individual electrical connections between the terminal conductors and the cathode plate, as well as forming physical adhesion connections or bonds between the faceplate and cathode plate to mount the cathode plate to the faceplate. This eliminates the need for heating spacers 26 to their melting point during assembly. The conductive bonds provide both mechanical and electrical connections between faceplate 12 and cathode plate 16.

Faceplate terminal conductors 62 extend outward on rear surface 18, beneath and beyond the peripheral spacer 22 discussed with reference to FIGS. 1–4, to external connector pads 78 (FIG. 5). These pads are accessible outside of the evacuated internal space of the flat-panel display. Being electrically connected to the emitter conductors of the cathode plate, they provide convenient points of electrical connection between the cathode plate and external driver circuitry.

Figure 9:
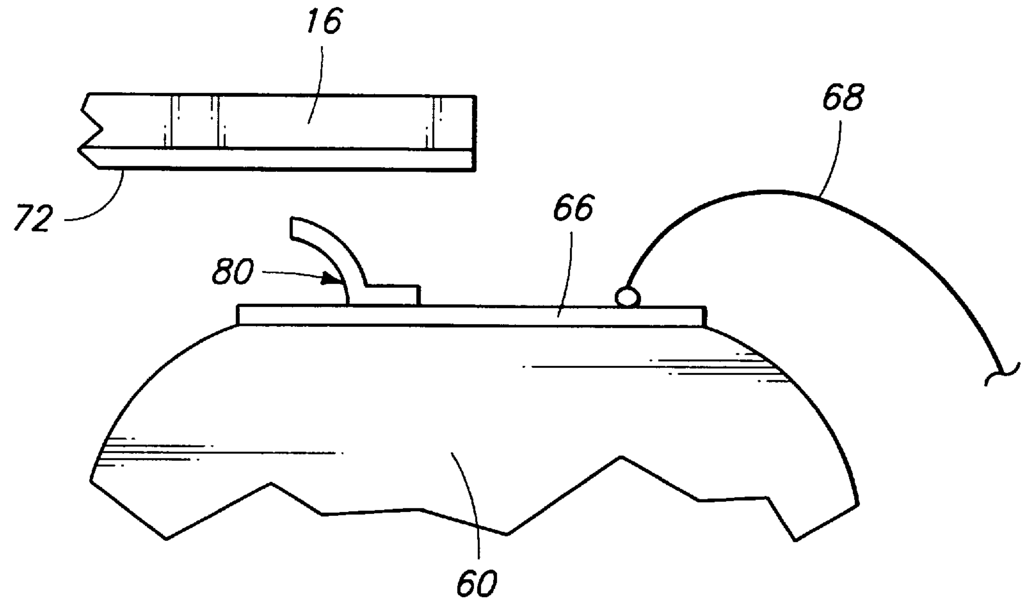
FIG. 9 is an enlarged cross-sectional view similar to FIG. 6, illustrating an improved method of providing electrical connections between a faceplate and a cathode plate. The faceplate and cathode plate are shown in positions prior to assembly.
Figure 10:
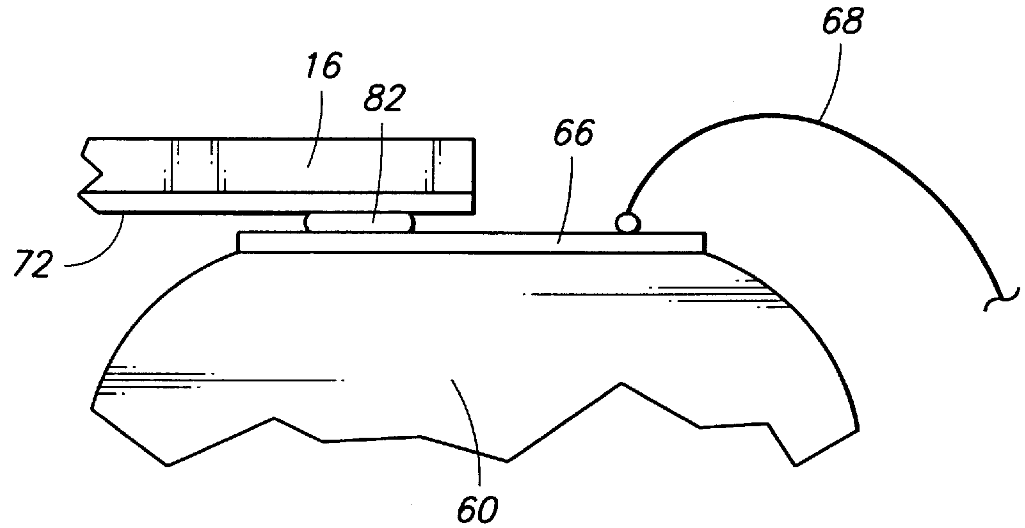
FIG. 10 is an enlarged cross-sectional view such as shown in FIG. 9, except that the faceplate and cathode plate are shown after assembly.

FIGS. 9 and 10 show an alternative method which is preferably used to create flip-chip connections or bonds between the faceplate and the cathode plate. The alternative method utilizes a conventional wire bonder or wire bonding machine such as the one used to create wire bond interconnections 68. Generally, the method comprises bonding stubs of bond wire either to connecting portions 66 of terminal connectors 62 or to the bond pads 72 of cathode plate 16. The bond wire stubs have projecting tails of bond wire which are interposed between and bonded to terminal connectors 62 and to bond pads 72 to form conductive flip-chip bonds therebetween.

More specifically, the alternative method comprises adjusting a wire bonder's tear length to a setting which leaves a projecting tail of severed bond wire at terminating wire bond connections. The projecting tail is preferably about two microns in length. Subsequent steps include making wedge bonds to connecting portions 66 of individual terminal conductors 62 with bond wire from the wire bonder. Such bonds could alternatively be made to cathode plate bond pads 72. Further preferred steps include abbreviating the wire bond connection by severing the bond wire adjacent said individual connecting portions or bond pads. The adjusted tear length of the wire bonder results in tails or stubs 80 of severed bond wire which project from said individual connecting portions or bond pads to form conductive bonds 82 between the cathode plate bond pads 72 and connecting portions 66 of terminal conductors 62 after cathode plate 16 is pressed against faceplate 12 as shown in FIG. 10.

Bonding wire stubs 80 can be formed as described above with a Model 1470 wire bonding machine, made by Kulicke and Soffa Inc., of Willow Grove, Pa. Aluminum wire having a diameter of about 0.00125 inches, with approximately 1% silicon, is one example of a suitable bonding wire.

It has been found that forming the abbreviated wedge bond connections described above result in compression and deformation of bonding wire within the bonding wedge of the wire bonding equipment. While this is a normal occurrence, the deformation is not allowed to clear the bonder wedge during repeated abbreviated connections because of the unusually short length of bonding wire which is allowed to pass through the wedge at each connection. Each subsequent abbreviated connection aggravates and compounds the deformation, until the wire eventually sticks or jams within the bonder wedge. This anomaly can be solved by interposing a normal point-to-point wire bond connection between each abbreviated connection. In the preferred embodiment described above, the wire bonder is programmed to alternate between forming individual bonded stubs or tails 80 and individual wire bond interconnections 68.

Forming flip-chip connections between the faceplate and the cathode plate allows connection to the cathode plate emitters through conductive traces and connector pads applied directly to the rear surface of the faceplate. This is a significant improvement over prior art devices in which similar connector pads were located on the cathode plate itself. One benefit of this configuration is that it allows the cathode plate to be completely enclosed within the evacuated space between the faceplate and the backplate. It is not necessary for portions of the cathode plate to be accessible for the formation of external connections. Rather, such external connections can be made to the faceplate connector pads.

Furthermore, this configuration greatly reduces the size of the cathode plate. Formerly, cathode plate connector pads have consumed valuable silicon areas. The construction and layout described above, in contrast, requires bond pads which are much smaller than required for external connections. This reduces the needed area of silicon, resulting in reduced cost and an increase number of cathode plates which can be produced per silicon wafer.

Figure 11:
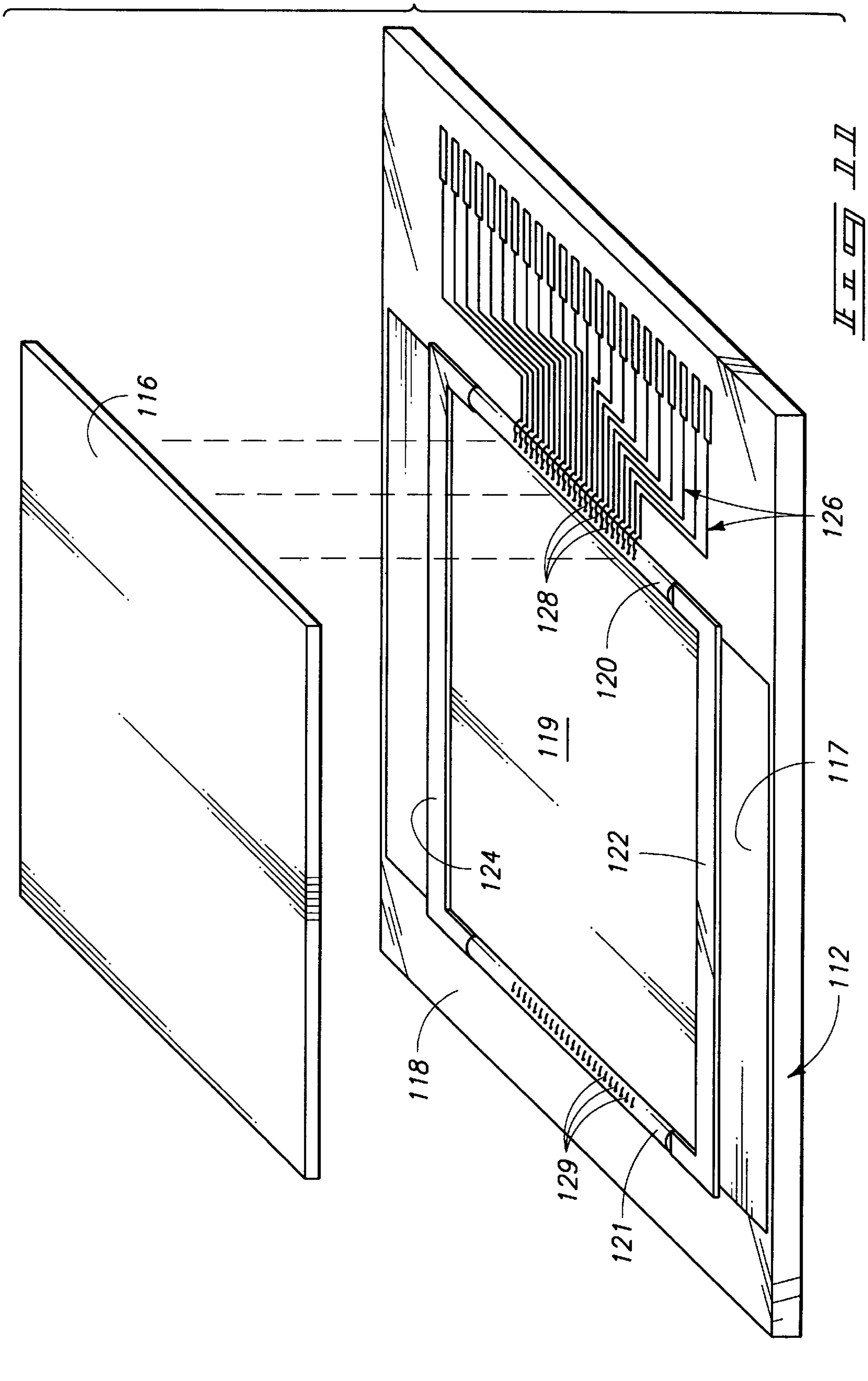
FIG. 11 is a simplified exploded perspective view of an alternative embodiment subassembly which includes a faceplate and a silicon cathode plate.
Figure 12:
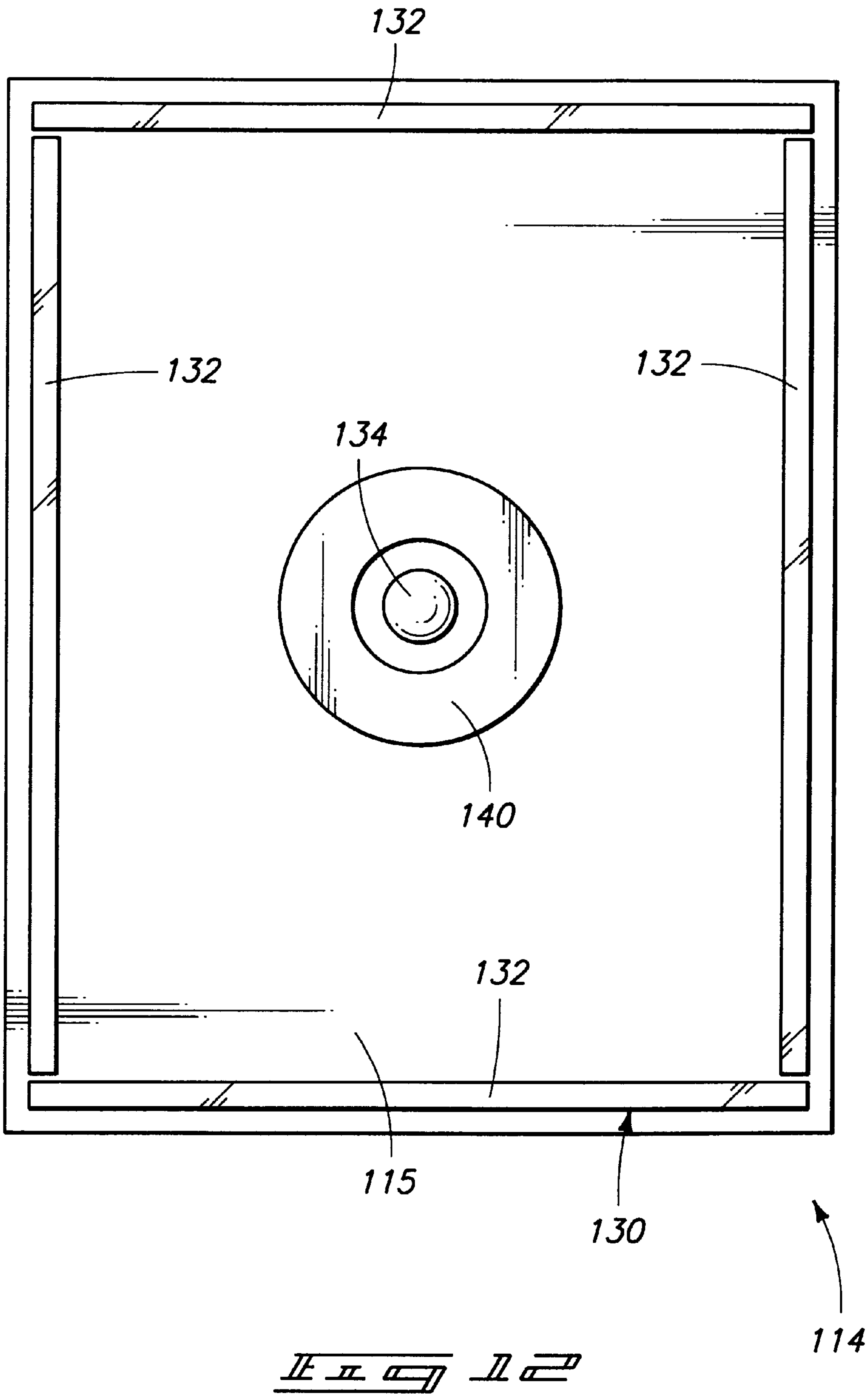
FIG. 12 is a view of the front surface of a backplate to be used in conjunction with the subassembly shown in FIG. 11.
Figure 11:
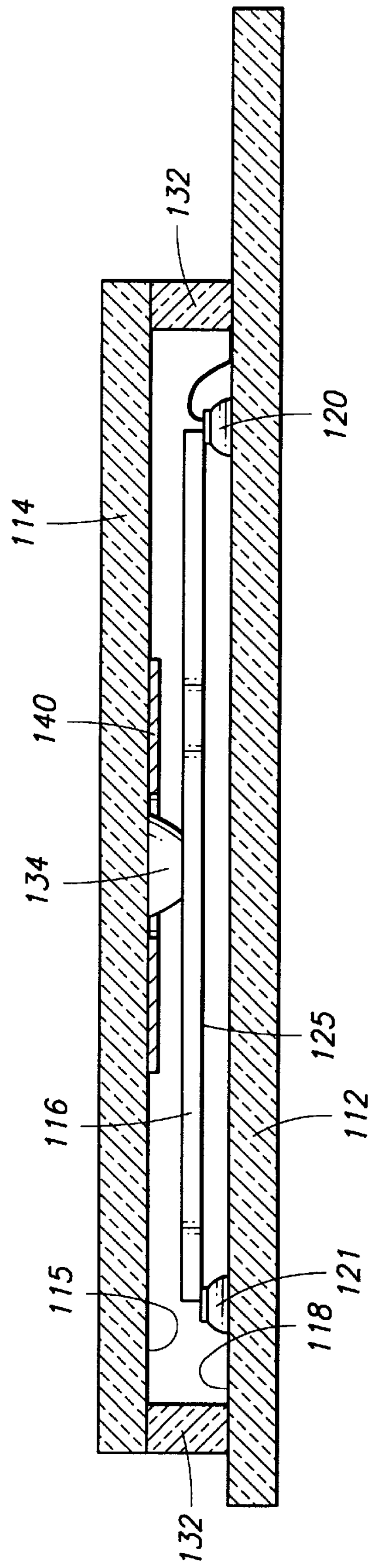

FIGS. 11–13 show components of a flat-panel field emission display in accordance with an alternative embodiment of the invention. The flat-panel display generally includes a transparent faceplate 112, a backplate 114 (FIG. 13), and a cathode plate 116 positioned between faceplate 112 and backplate 114. These components are the same as those discussed above except as otherwise noted. Backplate 114 is made from glass in a rigid and planar form. It has a front surface 115. Cathode plate 116 is formed from a silicon substrate. It has an emitter matrix (not shown) formed on a front surface 125.

Faceplate 112 is made from glass in a rigid and planar form. It has a rear surface 118. Rear surface 118 has a cathodoluminescent area 119 which is coated with phosphor. Underlying the phosphor is a conductive layer 117 of transparent material such as indium oxide, tin oxide, or indium tin oxide (layers 117 and 119 are shown only in FIG. 11). This conductive layer can extend beyond cathodoluminescent area 119, but must be patterned so that it does not underlie subsequently applied conductors.

Faceplate 112 is prepared for mating with cathode plate 116 by forming a pair of elevated connector ridges 120 and 121 on rear surface 118. Each connector ridge is an elevated platform formed by conventional thick film stenciling or screen printing techniques with a dielectric material. The ridges are preferably polished after their initial formation to leave a relatively flat surface on their peaks.

In the preferred embodiment, connector ridges 120 and 121 are about ten thousandths of an inch high after polishing. They are formed of a devitrifying glass frit which has a relatively high melting or softening point after firing, so that they are not affected by subsequent processing steps. Connector ridges 120 and 121 could alternatively be integrally formed with faceplate 112 by molding or extrusion.

Outlining strips 122 and 124 are formed over conductive layer 117 along lines corresponding in position to the eventual position of the outer periphery of cathode plate 116. These strips are formed by stenciling and firing the same material used to form connector ridges 120 and 121. However, they have a height which is significantly less than connector ridges 120 and 121. Specifically, outlining strips 122 and 124 are about one thousandth of an inch thick and about 0.020 inches or more wide. The purpose of these strips is to reduce or eliminate electron emissions from the sharp peripheral edges of cathode plate 116 toward conductive layer 117.

A plurality of faceplate terminal conductors 126 are formed to overlie faceplate rear surface 118. Conductors 126 are formed as already described with reference to FIG. 6. Faceplate terminal conductors 122 have portions which extend over at least one of connector ridges 120 and 121. In the embodiment shown, terminal conductors 122 have connecting portions 128 which extend over connector ridge 120.

Distinct from the terminal conductors 126, faceplate 112 has a set of connecting portions 129 which lie atop connector ridge 121. These connecting portions are present only for purposes of physically bonding cathode plate 116 to faceplate 112, and not necessarily for electrical connections. Connecting portions 129 correspond generally in size and spacing to connecting portions 128 of terminal conductors 126.

Figure 7:
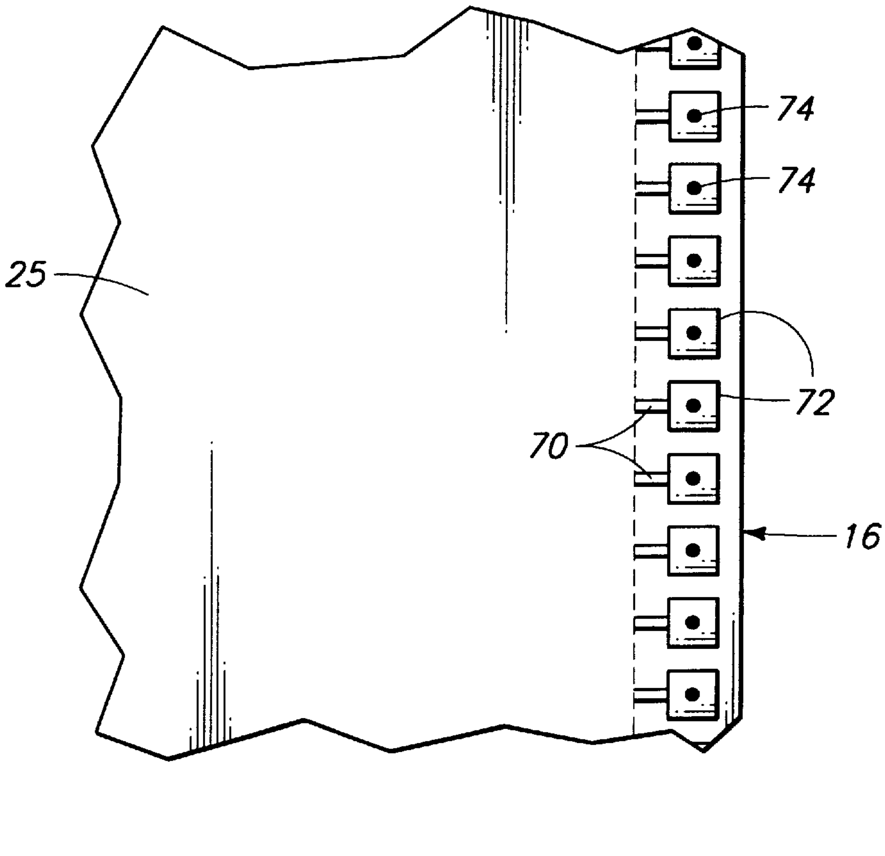
FIG. 7 is a partial front view of the cathode plate shown in FIG. 5.
Figure 8:
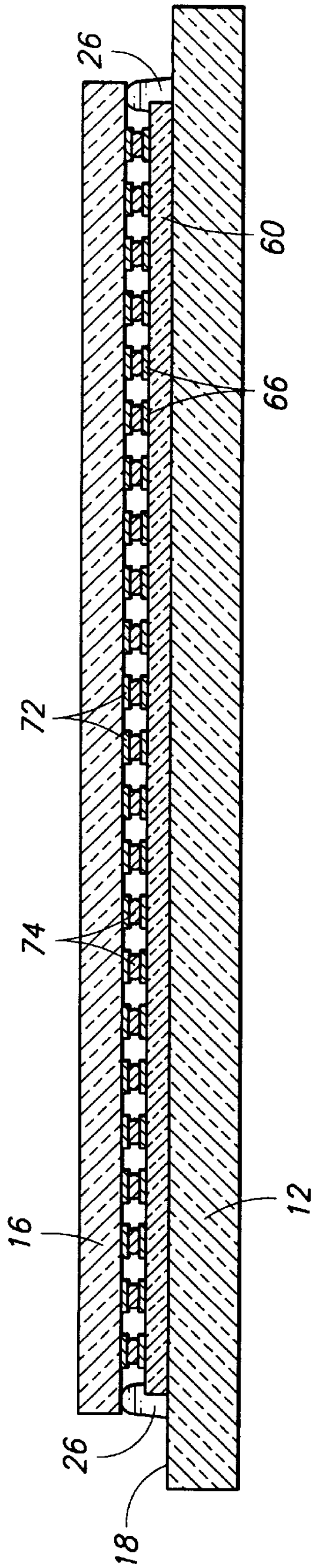
FIG. 8 is a sectional end view of the cathode plate and faceplate of FIG. 5, taken along the line 8—8 of FIG. 5. The faceplate and cathode plate are shown in their assembled positions.

Cathode plate 116 has bond pads as shown in FIG. 7 corresponding to connecting portions 128 of conductors 126. These bond pads connect to emitters and associated circuitry on cathode plate 116. Cathode plate 116 has a similar set of bond pads corresponding to connecting portions 129. Again, these bond pads are for subsequent physical bonding, and not for any necessary electrical connections.

Cathode plate 116 is bonded to faceplate 112 with flip-chip connections between the bond pads of cathode plate 116 and connecting portions 128 and 129. The flip-chip connections are implemented as already shown and described with reference to FIGS. 9 and 10.

This bonding of cathode plate 116 to faceplate 112 differs from the embodiment of FIGS. 5–8 primarily in that no separately-formed front positioning spacers are used. It has been found that connecting ridges 120 and 121 provide sufficient support to act as positioning spacers and to eliminate the need for further front spacers. The connecting ridges themselves establish the desired spacing between the faceplate and the cathode plate. This is possible, at least in part, because of the unique arrangement of faceplate, cathode plate, and backplate, in which the cathode plate is not subject to any differential pressure between its front and rear surfaces.

Backplate 114 is prepared by forming a rear peripheral positioning spacer 130 on front surface 115 (FIG. 12). Spacer 130 is sized and positioned to extend along the peripheral edges of backplate 114, and to completely surround cathode plate 116. Rear positioning spacer 130 is formed by bonding four thin glass strips 132 in a rectangular shape to the front surface 115 of backplate 114. Glass strips 132 preferably have cross-wise dimensions of about 0.040 inches by 0.1 inches. They are bonded to front surface 115 by a fired high temperature frit—preferably the same frit used to form connector ridges 120 and 121. This frit is also applied at the abutments of the strips to fill any gaps.

A peripheral seal is then formed in combination with glass strips 132 by applying a devitrifying or vitreous glass sealing frit (not shown) which adheres to the glass strips. This frit should have a softening temperature which is no greater than the vitrifying temperature of the frit used to form connector ridges 120 and 121. The frit is commonly applied as a paste. A bead or lump 134 of such paste is also applied to the central portion of front surface 115, within the area bounded by glass strips 132. Backplate 114 is then glazed in order to solidify the sealing frit and frit bead 134. This causes the frit to adhere to the underlying glass and to solidify, but does not cause the frit to fuse.

Evaporable getter material 140 is then applied or positioned around frit bead 134. In the embodiment shown, the getter material is in the form of a flat ring which surrounds frit bead 134.

Backplate 114 and the subassembly comprising faceplate 112 and cathode plate 116 are then bonded to each other. This bonding takes place in a vacuum chamber at the intended interior vacuum pressure for the display. The sealing frit material of backplate 114 is pressed against the periphery of the faceplate's rear surface 118, and the components are heated to first soften and then to vitrify the sealing frit and frit bead 134. The getter behind cathode plate 116 is activated during this process by the applied heat. This process results in the assembled structure of FIG. 13, in which cathode plate 116 is contained within an evacuated chamber bounded by glass strips 132, faceplate 112, and backplate 114. Frit bead 134 acts as a back spacer or support for cathode plate 116. The faceplate, backplate, and peripheral seal thus define an evacuated space which contains the cathode plate.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A flat-panel field emission display, comprising:

a faceplate having a rear surface;

a cathode plate spaced from the faceplate rear surface and having a plurality of emitters facing the faceplate rear surface, the cathode plate having an outermost periphery;

a backplate having an internal surface spaced from the cathode plate and from the faceplate rear surface, the spaced backplate forming a rearward vacuum space behind the cathode plate;

a peripheral seal extending between the faceplate and the backplate and received externally of the cathode plate outermost periphery, at least a portion of the peripheral seal extending continuously between and against the faceplate and the backplate; and at least one insulative spacer received between the cathode plate and the backplate laterally inward of the peripheral seal.

2. The flat-panel field emission display of claim 1 wherein the peripheral seal contacts the faceplate rear surface.

3. The flat-panel field emission display of claim 1 wherein the peripheral seal contacts the backplate internal surface.

4. The flat-panel field emission display of claim 1 further comprising at least one insulative spacer received between the cathode plate and the faceplate laterally inward of the peripheral seal.

5. The flat-panel field emission display of claim 1 wherein the at least one insulative spacer received between the cathode plate and the backplate is substantially centrally received relative to the cathode plate.

6. The flat-panel field emission display of claim 1 comprising a getter received within the rearward vacuum space.

7. The flat-panel field emission display of claim 1 comprising a getter received within the rearward vacuum space, the getter being received against the internal surface of the backplate.

8. The flat-panel field emission display of claim 1 wherein the cathode plate has a rear surface, and further comprising a getter received within the rearward vacuum space, the getter being received against the rear surface of the cathode plate.

9. A flat-panel field emission display, comprising:

a faceplate having a rear surface;

a cathode plate spaced from the faceplate rear surface and having a plurality of emitters facing the faceplate rear surface, the cathode plate having an outermost periphery;

a backplate having an internal surface spaced from the cathode plate and from the faceplate rear surface, the spaced backplate forming a rearward vacuum space behind the cathode plate;

a peripheral seal extending between the faceplate and the backplate and received externally of the cathode plate outermost periphery;

wherein the peripheral seal does not contact the cathode plate;

wherein the peripheral seal contacts the faceplate rear surface; and wherein the peripheral seal contacts the backplate internal surface.

10. A flat-panel field emission display, comprising:

a faceplate having a rear surface;

a cathode plate spaced from the faceplate rear surface and having a plurality of emitters facing the faceplate rear surface, the cathode plate having an outermost periphery;

at least one insulative spacer received between the faceplate and the cathode plate;

a backplate behind the cathode plate;

a peripheral seal;

a conductor extending from externally of the peripheral seal to between the faceplate and the peripheral seal, and over the at least one insulative spacer to and in electrical connection with the cathode plate; and wherein the peripheral seal extends from the faceplate to the backplate and is received externally of the cathode plate outermost periphery.

11. A flat-panel field emission display, comprising:

a faceplate having a rear surface;

a cathode plate spaced from the faceplate rear surface and having a plurality of emitters facing the faceplate rear surface, the cathode plate having an outermost periphery;

at least one insulative spacer received between the faceplate and the cathode plate;

a backplate behind the cathode plate;

a peripheral seal;

a conductor extending from externally of the peripheral seal to between the faceplate and the peripheral seal, and over the at least one insulative spacer to and in electrical connection with the cathode plate; and wherein the spacer has a ramped surface over which the conductor extends.

12. A flat-panel field emission display, comprising:

a faceplate having a rear surface;

a cathode plate spaced from the faceplate rear surface and having a plurality of emitters facing the faceplate rear surface, the cathode plate having an outermost periphery;

a backplate having an internal surface spaced from the cathode plate and from the faceplate rear surface, the spaced backplate forming a rearward vacuum space behind the cathode plate;

a conductive getter received within the rearward vacuum space against the internal surface of the backplate;

a peripheral seal; and a getter conductor extending from externally of the peripheral seal to between the faceplate and the peripheral seal to and in electrical connection with the conductive getter.

13. A flat-panel field emission display, comprising:

a faceplate having a rear surface;

a cathode plate spaced from the faceplate rear surface and having a plurality of emitters facing the faceplate rear surface, the cathode plate having an outermost periphery;

a backplate having an internal surface spaced from the cathode plate and from the faceplate rear surface, the spaced backplate forming a rearward vacuum space behind the cathode plate;

a conductive getter received within the rearward vacuum space, a peripheral seal;

a getter conductor extending from externally of the peripheral seal to between the faceplate and the peripheral seal to and in electrical connection with the conductive getter; and wherein the peripheral seal extends from the faceplate to the backplate and is received externally of the cathode plate outermost periphery.

14. A flat-panel field emission display, comprising:

a faceplate having a rear surface;

a cathode plate spaced from the faceplate rear surface and having a plurality of emitters facing the faceplate rear surface, the cathode plate having an outermost periphery;

a backplate having an internal surface spaced from the cathode plate and from the faceplate rear surface, the spaced backplate forming a rearward vacuum space behind the cathode plate;

at least one spacer received between the backplate and the cathode plate;

a getter received within the rearward vacuum space; and a peripheral seal.

15. The flat-panel field emission display of claim 14 wherein the getter contacts the spacer.

16. The flat-panel field emission display of claim 14 wherein the spacer is insulative.

17. The flat-panel field emission display of claim 14 wherein the getter is conductive.

18. The flat-panel field emission display of claim 14 wherein the spacer is received on the backplate internal surface.

19. The flat-panel field emission display of claim 18 wherein the getter contacts the spacer.

20. The flat-panel field emission display of claim 14 wherein the getter surrounds the spacer.

21. A flat-panel field emission display, comprising:

a faceplate having a rear surface;

a cathode plate spaced from the faceplate rear surface and having a plurality of emitters facing the faceplate rear surface, the cathode plate having an outermost periphery;

a backplate having an internal surface spaced from the cathode plate and from the faceplate rear surface, the spaced backplate forming a rearward vacuum space behind the cathode plate;

a peripheral seal extending between the faceplate and the backplate and received externally of the cathode plate outermost periphery; and wherein the peripheral seal does not contact the cathode plate.

22. A flat-panel field emission display, comprising:

a faceplate having a rear surface;

a cathode plate spaced from the faceplate rear surface and having a plurality of emitters facing the faceplate rear surface, the cathode plate having an outermost periphery;

a backplate having an internal surface spaced from the cathode plate and from the faceplate rear surface, the spaced backplate forming a rearward vacuum space behind the cathode plate;

at least one spacer received between the backplate and the cathode plate;

a getter received within the rearward vacuum space and contacting the spacer; and a peripheral seal.

23. The flat-panel field emission display of claim 22 wherein the spacer is received on the backplate internal surface.

24. The flat-panel field emission display comprising a faceplate having a rear surface;

a cathode plate rearwardly adjacent the faceplate rear surface, the cathode plate having a plurality of emitters facing the faceplate rear surface, the cathode plate comprising a plurality of cathode plate conductors in electrical connection with the emitters;

a plurality of faceplate terminal conductors formed over the rear surface of the faceplate;

the cathode plate conductors and the faceplate conductors being electrically interconnected; and an elongated dielectric material interconnecting ridge formed over the faceplate rear surface, the faceplate terminal conductors being formed over the ridge and extending externally to conductive connector pads.

25. A flat-panel field emission display, comprising:

a luminescent faceplate having a rear surface;

a cathode plate having a front surface which is spaced rearwardly from the rear surface of the luminescent faceplate;

an emitter matrix formed on the front surface of the cathode plate facing the luminescent faceplate;

a backplate spaced from the cathode plate creating a rearward vacuum space behind the cathode plate;

a peripheral seal between the faceplate and the backplate; the faceplate, backplate, and peripheral seal defining an evacuated space which contains the cathode plate;

a positioning spacer on the rear surface of the luminescent faceplate;

a connector ridge on the rear surface of the luminescent faceplate;

a plurality of conductive traces overlying the rear surface of the luminescent faceplate and extending over the elevated connector ridge to externally of the evacuated space; and the cathode plate being positioned against the positioning spacer, the positioning spacer establishing a spacing between the faceplate and the cathode plate, the cathode plate being positioned over the connector ridge for electrical contact between the cathode plate and portions of the conductive traces extending over the connector ridge.

26. A flat-panel field emission display, comprising:

a faceplate having a rear surface;

a cathode plate spaced from the faceplate rear surface and having a plurality of emitters facing the faceplate rear surface, the cathode plate having an outermost periphery and a rear surface;

a backplate having an internal surface spaced from the cathode plate and from the faceplate rear surface, the spaced backplate forming a rearward vacuum space behind the cathode plate;

a conductive getter received within the rearward vacuum space against the rear surface of the cathode plate;

a peripheral seal; and a getter conductor extending from externally of the peripheral seal to between the faceplate and the peripheral seal to and in electrical connection with the conductive getter.

* * * * *